(12) United States Patent
Seki et al.

(10) Patent No.: US 7,712,756 B2
(45) Date of Patent: May 11, 2010

(54) STEERING DAMPER MOUNTING STRUCTURE

(75) Inventors: Yoshitaka Seki, Saitama (JP); Jun Hariu, Saitama (JP); Hiroshi Nakagome, Saitama (JP); Toshihisa Nagashii, Saitama (JP); Hitoshi Akaoka, Saitama (JP); Takeshi Wakabayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 11/394,087

(22) Filed: Mar. 31, 2006

(65) Prior Publication Data

US 2006/0220340 A1  Oct. 5, 2006

(30) Foreign Application Priority Data

Mar. 31, 2005 (JP) .............................. 2005-102499

(51) Int. Cl.
 *B62K 21/00* (2006.01)
(52) U.S. Cl. ..................... 280/272; 180/219; 280/271
(58) Field of Classification Search ................. 180/219; 280/271, 272
 See application file for complete search history.

(56) References Cited

U.S. PATENT DOCUMENTS

| 6,848,698 | B2 * | 2/2005 | Hasegawa et al. ........... 280/272 |
| 7,021,642 | B2 * | 4/2006 | Sato et al. .................... 280/272 |
| 2002/0175489 | A1 * | 11/2002 | Hasegawa et al. ........... 280/272 |
| 2004/0206565 | A1 * | 10/2004 | Nagashii et al. ............. 180/219 |

FOREIGN PATENT DOCUMENTS

| EP | 1 323 946 A1 | 7/2003 |
| EP | 1 459 971 A2 | 9/2004 |
| EP | 1459971 A2 * | 9/2004 |
| EP | 1 514 786 A1 | 3/2005 |
| JP | 6 298146 A | 10/1994 |
| JP | 2002-347684 A | 12/2002 |

* cited by examiner

*Primary Examiner*—Ruth Ilan
*Assistant Examiner*—Jacob Knutson
(74) *Attorney, Agent, or Firm*—Birch, Stewart, Kolasch & Birch, LLP

(57) ABSTRACT

To arrange a steering damper behind a head pipe in a compact manner while suppressing the influence of the steering damper on an intake duct which penetrates the vicinity of head pipes of a vehicle body frame. A steering damper is arranged between left and right main frames of a vehicle body frame and, at the same time, is arranged above or below an intake duct which penetrates the vicinity of a head pipe of the vehicle body frame.

20 Claims, 7 Drawing Sheets

STEERING DAMPER MOUNTING STRUCTURE

CROSS-REFERENCE TO RELATED APPLICATIONS

The present application claims priority under 35 USC 119 to Japanese Patent Application No. 2005-0102499 filed on Mar. 31, 2005 the entire contents of which are hereby incorporated by reference.

FIELD OF THE INVENTION

The present invention relates to the mounting structure of a steering damper in a vehicle such as a motorcycle.

DESCRIPTION OF BACKGROUND ART

A steering damper mounting structure is known wherein the steering damper is arranged behind a head pipe of a vehicle body frame and between left and right main frames. Thus, a projection height of the steering damper is suppressed from an upper surface of the vehicle body frame. See, for example, JP-A-2002-347684.

In JP-A-2002-347684, behind the head pipe an intake duct is arranged that extends forward from an air cleaner box and penetrates the vicinity of the above-mentioned head pipe of the vehicle body frame. Accordingly, there has been a demand for a constitution which allows the steering damper to be arranged behind the head pipe in a compact manner while suppressing the influence on an intake duct.

SUMMARY AND OBJECTS OF THE INVENTION

It is an object of the invention to provide a steering damper mounting structure which can arrange the steering damper behind the head pipe in a compact manner, while suppressing the on the intake duct which passes through the vicinity of the head pipe of the vehicle body frame.

According to an embodiment of the present invention, a steering damper mounting structure for a vehicle, for example, a motorcycle 1, includes a pair of left and right main frames 7 which extend toward a rear portion of a vehicle body from a head pipe 6 mounted on a front end portion of a vehicle body frame 5 in a left-and-right split manner for allowing the head pipe to rotatably support a steering system for steering a front wheel 2. A steering damper 100 is provided for imparting an attenuating force to the steering system between the left and right main frames. The steering damper is arranged above or below an intake duct 80 which penetrates the vicinity of the head pipe of the vehicle body frame.

Due to such a constitution, it is possible to suppress a projection height of a steering damper from an upper surface of a vehicle body frame. Thus, respective parts in the periphery of a head pipe can be arranged efficiently and in a compact manner. Further, since the steering damper can be dropped in the inside of the vehicle body frame, the steering damper can be made less conspicuous thus enhancing an appearance of the motorcycle. Further, since a position of the steering damper is lowered, a driver can easily bend his/her upper body portion whereby the miniaturization of a cowl and the traveling performance can be enhanced. Further, the intake duct which penetrates the vicinity of the head pipe of the vehicle body frame becomes a straight line compared to a case in which the intake duct is arranged around the steering damper. Thus, the intake resistance can be suppressed whereby it is possible to introduce a favorable air flow.

According to an embodiment of the present invention, the steering damper is of a rotary type which generates the attenuating force due to the tilting of the vane 103 which partitions the oil chamber 101 inside of the housing 102. At the same time, the rotary shaft 104 of the steering damper is arranged at the approximate center in the lateral direction of the vehicle body. Accordingly, compared to a rod-type steering damper which uses a double acting cylinder, the steering damper per se can be formed in a compact manner and, at the same time, a rotating shaft of the steering damper can be arranged close to the head pipe. Thus, it is possible to enhance the degree of freedom in the arrangement of the steering damper.

Further, according to an embodiment of the present invention, the steering damper is of an electronic control type which changes the attenuating force in response to a predetermined parameter, even when a control unit is integrally mounted on the steering damper, it is possible to arrange the steering damper in a compact manner by suppressing a projection height of the steering damper from an upper surface of the vehicle body frame.

According to an embodiment of the present invention, the steering system includes the steering shaft 4c which is rotatably and pivotally supported on the head pipe, left and right front forks 3 and bridge members, for example, the top bridge 4a and the bottom bridge 4b, which connect the respective front forks and the steering shaft. The steering damper is connected with a connecting portion 105c which projects rearwardly from the bridge member by way of a link mechanism 105. Accordingly, a relative mounting tolerance between parts of a steering system and steering damper can be absorbed. Thus, it is possible to operate the steering damper in a good condition and, at the same time, the degree of freedom in the layout of the link mechanism with respect to the bridge members can be enhanced.

Still further, according to an embodiment of the present invention, since the steering damper is arranged inside of a tank cover 22 the functional parts can be made inconspicuous to thus enhance an appearance of a periphery of the head pipe.

Further, according to an embodiment of the present invention, the intake duct opens toward a front portion of the vehicle body, a rear portion of the intake duct is connected to an air box 19 which is arranged between the left and right main frames, and the steering damper is arranged in a space which is sandwiched between the air box and the head pipe. Accordingly, respective parts in a periphery of the head pipe can be arranged in a more compact manner.

According to an embodiment of the present invention, the steering damper can be arranged in a compact manner behind the head pipe while suppressing the influence on the intake duct which penetrates the vicinity of the head pipe of the vehicle body frame.

According to an embodiment of the present invention, the degree of freedom in the arrangement of the steering damper can be enhanced.

According to an embodiment of the present invention, the electronic-control-type steering damper can be arranged in a compact manner.

According to an embodiment of the present invention, it is possible to allow the steering damper to be operated favorably.

According to an embodiment of the present invention, the appearance of the periphery of the head pipe can be enhanced.

According to an embodiment of the present invention, the steering damper can be arranged in a more compact manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
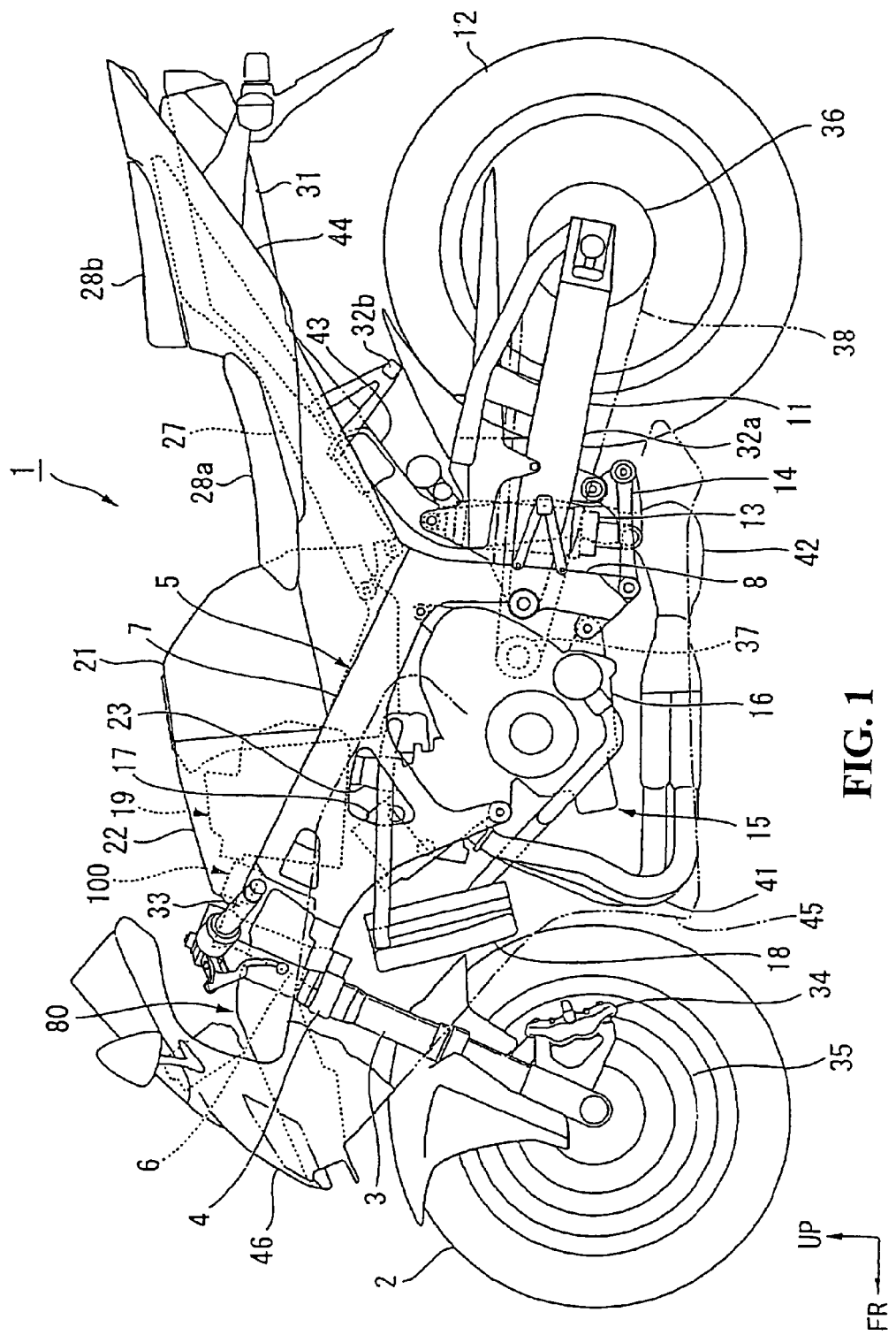
FIG. 1 is a side surface view of a motorcycle according to the embodiment of the invention.

Hereinafter, embodiments of the invention are explained in conjunction with attached drawings. The directions of "front," "rear," "left," "right" and the like in the explanation made hereinafter are, unless otherwise specified, assumed to be equal to the corresponding directions of the vehicle. Further, in the drawings, an arrow FR indicates the frontward direction of the vehicle, an arrow LH indicates the leftward direction of the vehicle, and an arrow UP indicates upward direction of the vehicle.

As shown in FIG. 1, a pair of left and right front forks 3 which supports a front wheel 2 of a motorcycle 1 is pivotally supported on a head pipe 6 of a vehicle body frame 5 by way of a steering stem 4 in a steerable manner. Left and right main frames 7 extend obliquely in the rearward and downward direction from the head pipe 6, and rear end portions of the respective main frames 7 are contiguously formed with upper portions of left and right pivot plates 8.

A front end portion of a swing arm 11 is pivotally supported on the respective pivot plate 8 in a tiltable manner, while a rear wheel 12 is pivotally supported on a rear end portion of the swing arm 11. A rear shock absorber 13 is mounted in the vicinity of a front end portion of the swing arm 11 with one end portion of the rear shock absorber 13 is connected to the swing arm 11, and another end portion of the rear shock absorber 13 is connected to a portion of the pivot plate 8 below a pivot shaft by way of a link mechanism 14.

Below the vehicle body frame 5, a water-cooled parallel-four-cylinder-type engine 15 which constitutes a prime mover of the motorcycle 1 is mounted. The engine 15 includes a cylinder portion 17 that is raised upwardly and frontwardly in an oblique posture from a crank case 16 which forms a lower portion of the engine 15. A radiator 18 is provided for cooling the engine 15 and is mounted in front of the cylinder portion 17. An air cleaner box (air box) 19 is mounted above the cylinder portion 17 with a fuel tank 21 being mounted behind the air cleaner box 19. An upper portion of the air cleaner box 19 is covered with a tank cover 22 which is coplanar with a fuel tank 21.

Figure 2:
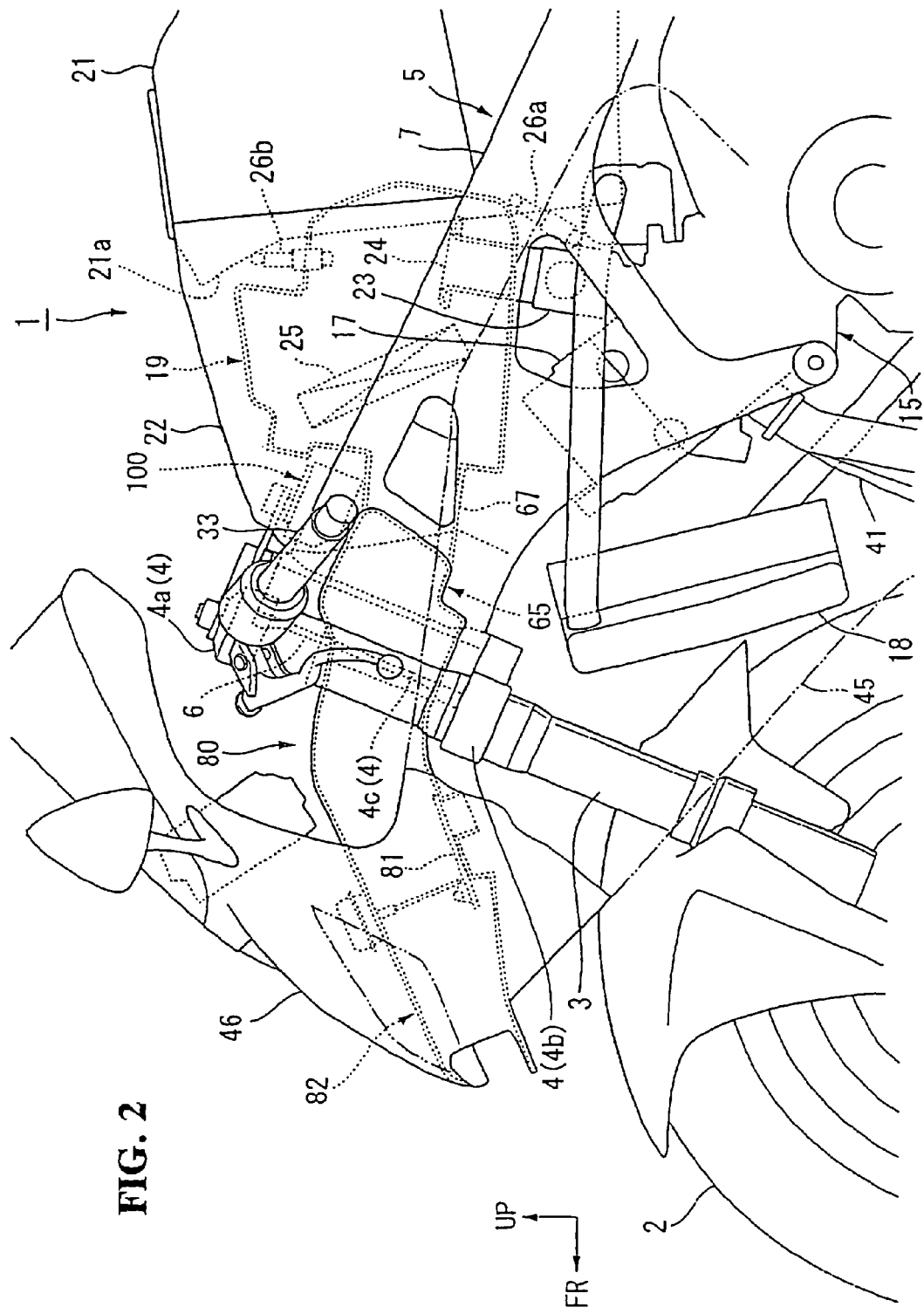
FIG. 2 is an enlarged view of an essential part of FIG. 1.

To explain this embodiment also in conjunction with FIG. 2, a front end portion 21a of the fuel tank 21 is provided at a position where the front end position 21a is overlapped to the approximate center in the longitudinal direction of the main frame 7 as viewed in a side view, wherein the front end portion 21a is erected substantially vertically. Since the tank cover 22, having an outer surface thereof which is coplanar with an outer surface of the front end portion 21a, is contiguously connected to a front side of the front end portion 21a, an integral tank shape is formed. The air cleaner box 19 which is arranged between front portions of both main frames 7 and the steering damper 100 which is arranged in a space defined between the air cleaner box 19 and the head pipe 6 are covered with the above-mentioned tank cover 22 from above.

To a lower wall portion of the air cleaner box 19, upstream sides of quadruple throttle bodies 23 which correspond to the respective cylinders are connected. Downstream sides of the respective throttle bodies 23 are connected to intake ports formed on a rear portion of the cylinder portion 17. Inside of the air cleaner box 19, funnels 24 are arranged which are communicated with the respective throttle bodies 23.

To a front portion of the air cleaner box 19, an intake duct 80 is connected that penetrates the vicinity of the head pipe 6 of the vehicle body frame 5 and opens at a front end portion of a front cowl 46. A flow of outside air (traveling air) can be introduced into the inside of the air cleaner box 19 by way of the intake duct 80. At the time of high-speed traveling, a so called ram pressure super charge which makes use of the air flow pressure as a super charge pressure can be performed. Inside the intake duct 80, an intake valve 81 is provided which varies an intake passage.

The outside air which is introduced into the inside of the air cleaner box 19 is introduced into the inside of the respective funnels 24 after being filtered through an air cleaner element 25, and is supplied to the engine 15 together with fuel injected from first injectors 26a which are mounted on the respective throttle bodies 23. On an upper wall portion of the air cleaner box 19, second injectors 26b are mounted which inject fuel to the respective funnels 24 during the high rotation of the engine, for example, and correspond to the respective cylinders.

To an upper rear side of each main frame 7 a front end portion of a seat frame 27 is fastened which is inclined rearwardly and upwardly. On the seat frame 27, a seat 28a for a driver is positioned behind the fuel tank 21. A pillion seat 28b for a rear pillion is positioned behind the driver's seat 28a. A muffler 31 is arranged below the pillion seat 28b. A step 32a for a driver is mounted on a rear portion of each pivot plate 8. Steps 32b for a rear pillion are mounted on lower portions of both sides of the seat frame 27.

On upper end portions of the respective front forks 3, left and right handles 33 for steering the front wheel are mounted. A brake caliper 34 is mounted on a lower end portion of each front fork 3, while a brake disc 35 which corresponds to each brake caliper 34 is mounted on both sides of a hub portion of the front wheel 2 thus constituting a front disc brake of the motorcycle 1. Behind the head pipe 6, the steering damper 100 is arranged which imparts an attenuating force to a front wheel steering system.

Here, the above-mentioned front wheel steering system (hereinafter, simply refer to as steering system) includes a steering stem 4 and respective front forks 3. Further, steering stem 4 includes a steering shaft 4c which is inserted into the head pipe 6 and is rotatably and pivotally supported by the head pipe 6, and a top bridge 4a and a bottom bridge 4b which connect the steering shaft 4a and the respective front forks 3.

A rear sprocket wheel 36 is mounted on a left side of a hub portion of the rear wheel 12 with drive chain 38 extending and wound around the rear sprocket wheel 36 and a drive sprocket wheel 37 mounted on a left side of a rear portion of the engine 15 thus allowing the transmission of power between the engine 15 and the rear wheel 12. Here, on a right side of the rear wheel 12, a rear disc brake is mounted having a construction similar to the construction of the above-mentioned front disc brake.

To exhaust ports formed in a front portion of the cylinder portion 17, exhaust pipes 41 which correspond to the respective cylinders are connected. The respective exhaust pipes 41 pass in front of and below the engine 15 and converge into a single pipe. Thereafter, the single pipe is erected on a right side of a front portion of the swing arm 11 and is disposed around the vicinity of the seat frame 27, and is connected to the above-mentioned muffler 31. An exhaust catalyst 42 for purifying an exhaust gas is provided together with an exhaust device 43 which changes a flow area of the inside of the exhaust pipe 41.

A rear cowl 44 for covering a periphery of the seat frame 27 is mounted on the rear portion of the vehicle body. A center cowl 45 for covering a periphery of the engine 15 is mounted on both sides of the center of the vehicle body. The front cowl 46 for covering a periphery of the head pipe 6 is mounted on the front portion of the vehicle body. Inside the front cowl 46, a cowl inner duct 82 is arranged that forms an intake passage extending from a front end portion of the vehicle body frame 5 to a front end portion of the front cowl 46 in the above-mentioned intake duct 80.

Figure 3:
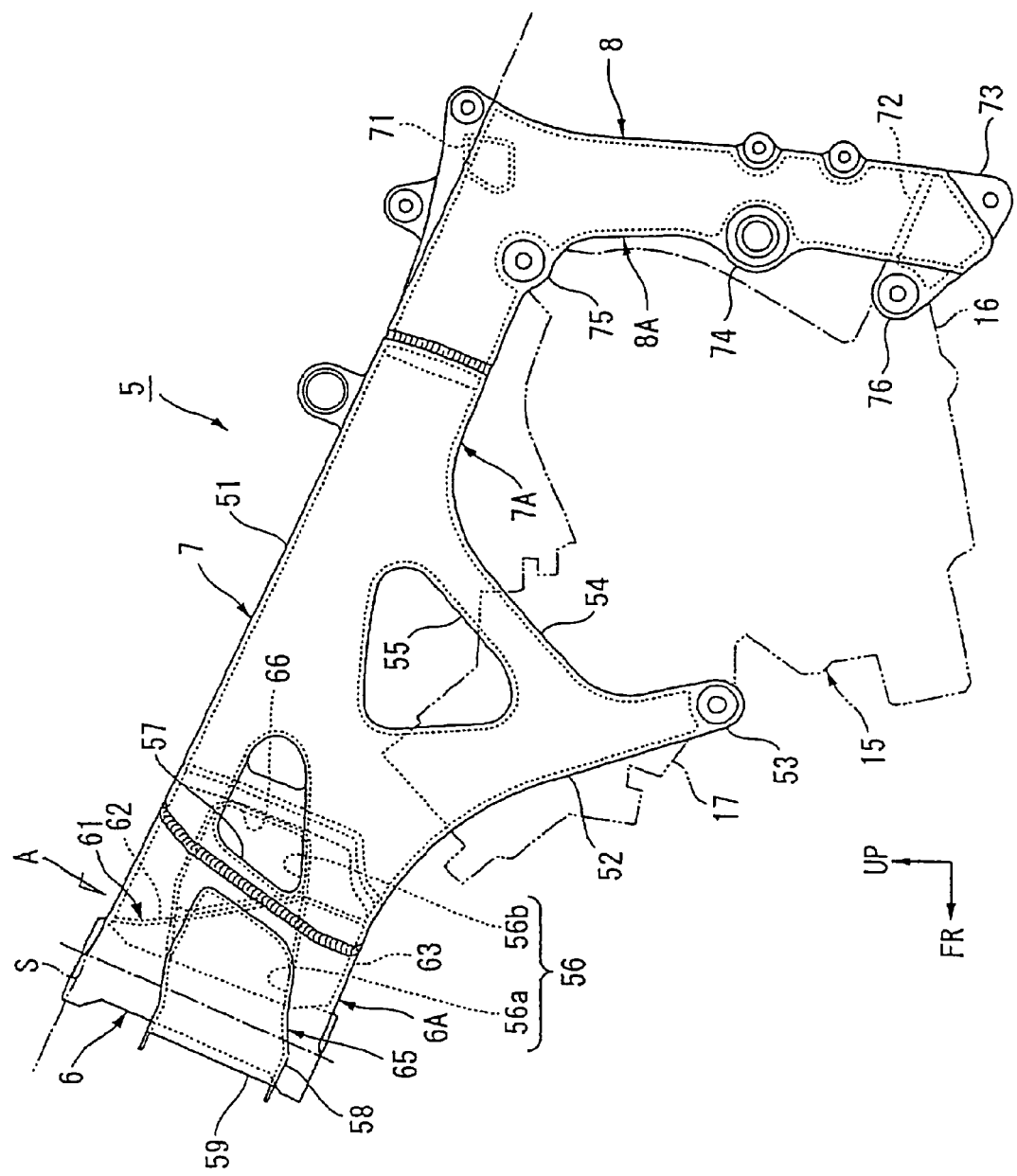
FIG. 3 is a side surface view of the vehicle body frame of the above-mentioned motorcycle.
Figure 4:
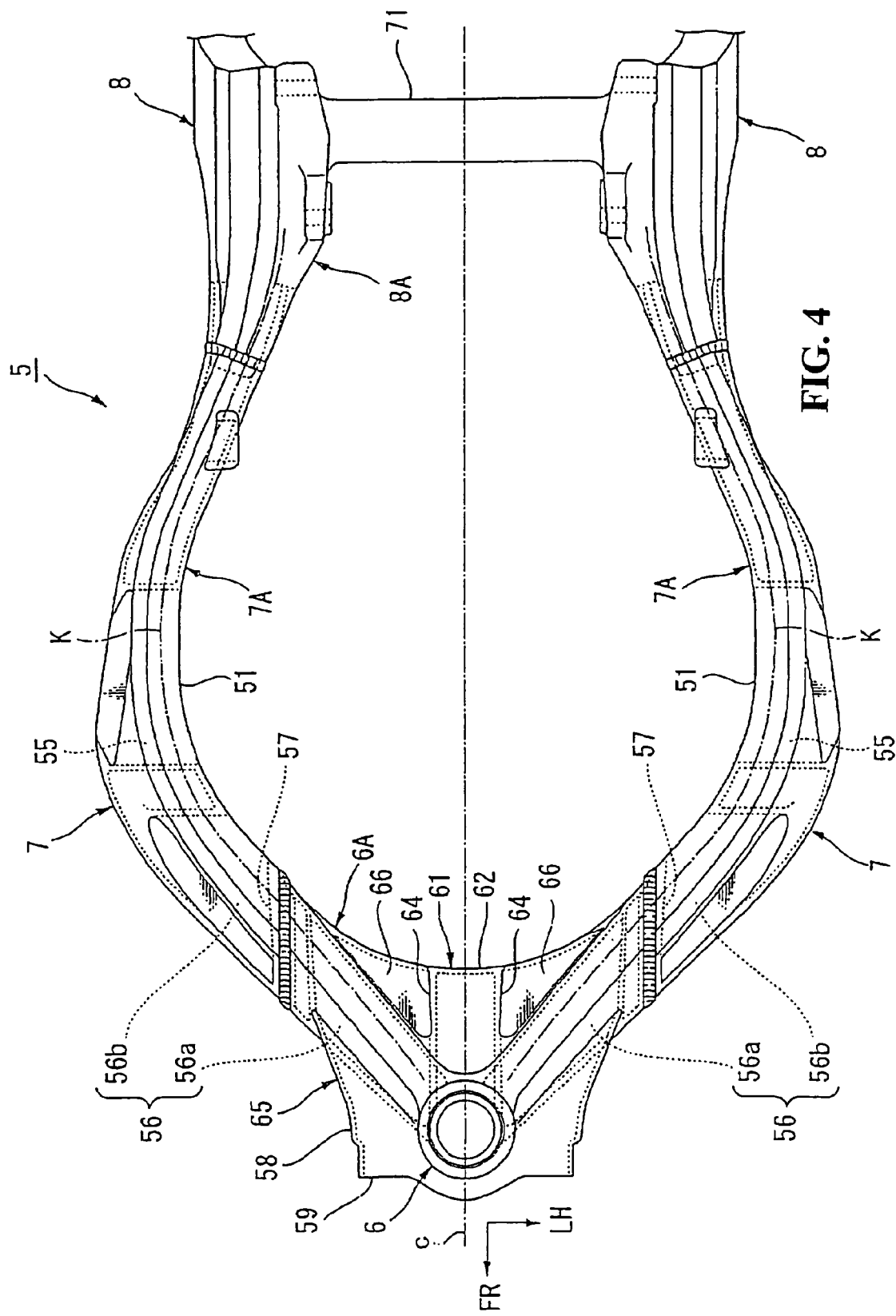
FIG. 4 is a view as viewed in an arrow A direction in FIG. 3.

As shown FIGS. 3 and 4, the vehicle body frame 5 is a so-called twin-tube frame which linearly connects the head pipe 6 and the respective pivot frames 8 by the respective main frames 7. Further, the vehicle body frame 5 also constitutes the so-called diamond frame structure that makes use of the engine 15 which the vehicle body frame 5 per se suspends as a strength member. Such a vehicle body frame 5 is formed by integrally joining by welding a plurality of cast parts that use an aluminum alloy as a raw material. Here, the above-mentioned seat frame 27 includes left and right split bodies which are cast parts using an aluminum alloy as a raw material, wherein these split bodies have front end portions thereof integrally fastened to the rear end portion of the vehicle body frame 5 and, at the same time, rear end portions thereof integrally fastened to each other.

The head pipe 6 is formed of an inclined cylindrical pipe which has an upper portion thereof positioned on a rear side, wherein the respective main frames 7 extend rearwardly along a rearwardly and downwardly extending inclined plane S which is substantially orthogonal to an axis of the head pipe 6. An upper end of the head pipe 6 and an upper surface of the main frame 7 are substantially positioned on the inclined plane S.

The respective main frames 7, as viewed from an upper surface which is orthogonal to the inclined plane S (as viewed in the direction indicated by an arrow in FIG. 3), extend from the head pipe 6 in a state wherein the respective main frames 7 are bifurcated rearwardly and outwardly in the oblique posture in the vehicle width direction, have longitudinally intermediate portions thereof that are gently curved, extend rearwardly and inwardly in the vehicle width direction and, thereafter, are connected smoothly with left and right pivot plates 8 which are arranged substantially parallel to each other. In FIG. 3 and other drawings, a vehicle-width-direction center line (lateral-direction center line) is indicated by symbol C. Further, curves which are curved along the respective main frames 7 on the inclined plane S (in other wards, curves along the extending direction of the respective main frames 7) are indicated by symbol K.

Assuming a direction which is orthogonal to the above-mentioned inclined plane S as the longitudinal direction (substantially corresponding to the vertical direction) of the main frame 7 and a direction which is parallel to the inclined plane S and is orthogonal to the above-mentioned curve K as the lateral direction of the main frame 7 (corresponding to the inner-outer direction of the vehicle body), a cross-sectional shape of each main frame 7 adopts a hollow structure which is formed in a longitudinal rectangular shape in which a size in the longitudinal direction is larger than a size in the lateral direction and an outer peripheral portion has a predetermined wall thickness.

Further, a portion of each main frame 7 which extends linearly from the head pipe 6 to the pivot frame 8 as viewed in a side view as a frame body 51, includes a front half of the frame body 51 that has a longitudinal length substantially equal to a length of the head pipe 6, while a rear half of the frame body 51 has a longitudinal length shorter than the length of the head pipe 6. Further, a tapered engine hanger 52 extends downwardly from the front half of the frame body 51. A front suspension portion 53 is formed on a distal end of the engine hanger 52 and is connected to a front side of a proximal portion of the cylinder portion 17 of the engine 15 for supporting the engine 15.

Further, between a rear portion of the engine hanger 52 and a lower side of the rear half of the main frame 7, a reinforcing member 54 extends which is inclined rearwardly and upwardly. In a longitudinally intermediate portion of the main frame 7, a center opening portion 55 which penetrates the longitudinally intermediate portion in the vehicle width direction is formed in a state wherein the center opening portion 55 is surrounded by the reinforcing member 54, the engine hanger 52 and the frame body 51.

On the other hand, in a front portion of the main frame 7 (frame body 51), a front opening portion 56 is formed which penetrates a longitudinally intermediate portion in the vehicle width direction to bifurcate the front portion of the main frame 7 toward a front side.

The respective opening portions 55, 56, while cutting inner and outer walls of the hollow main frame 7, include inner peripheral walls which extend between the inner and outer walls, wherein the inner peripheral walls also function as cross members which connect the above-mentioned inner and outer walls. By forming these respective opening portions 55, 56 in the main frame 7, it is possible to optimize the rigidity and balance of the whole vehicle body frame 5.

The front opening portion 56 has a triangular shape as viewed in a side view which is shallow in the longitudinal direction and is tapered rearwardly. On the longitudinally intermediate portion of the front opening portion 56, a rib portion 57 is formed which traverses the longitudinally intermediate portion along a surface which is substantially orthogonal to lateral direction. The front opening portion 56 is defined into a head-side opening portion 56a and a frame-side opening portion 56b by the rib portion 57.

On an outer side of the front end portion of the vehicle body frame 5, a duct cover 58 is integrally mounted that extends between the head pipe 6 and front portions of both main frames 7. An intake port 59 which opens frontwardly right in front of the head pipe 6 is formed in the duct cover 58 and, at the same time, the intake port 59 and the respective head-side opening portions 56a communicate with each other. To such an intake port 59 of the duct cover 58, a rear end portion (intake air discharge port) of the cowl inner duct 82 is connected.

Further, inside of the front end portion of the vehicle body frame 5, a gusset 61 is integrally provided that extends between the head pipe 6 and front portions of both main frames 7. The gusset 61 includes a curved wall portion 62 which is curved in a state wherein the curved wall portion 62 projects to a front side as viewed in an upper plan view, and a lower wall portion 63 which extends to the front side from a lower periphery of the curved wall portion 62. The curved wall portion 62 extends downwardly from an upper rear end portion of the head pipe 6 and a front upper peripheral portion of the main frame 7 in a state wherein the curved wall portion 62 extends obliquely in a gradually spaced-apart manner with respect to the head pipe 6, and is contiguously formed with a rear periphery of the flat lower wall portion 63 which is overlapped to a lower peripheral portion of the main frame 7 as viewed in a side view. Accordingly, the gusset 61 can, while reinforcing the front end portion of the vehicle body frame 5, enlarge a space between front upper sides of both main frames 7 arranged behind the head pipe 6 thus facilitating the arrangement of the steering damper 100 or the like as illustrated in FIG. 2.

The inside of the gusset 61 is divided by a pair of partition walls 64 which extend rearwardly from both side peripheral portions of the head pipe 6 thus forming a frame inner duct 65 which is bifurcated to both sides of the head pipe 6 from the intake port 59 of the front end of the duct cover 58 on the front end portion of the vehicle body frame 5. The frame inner duct 65 opens left and right intake discharge ports 66 in the curved wall portion 62 of the gusset 61, while to these respective intake discharge ports 66, a front end portion (intake port) of the box-side duct 67 which extends from a front wall portion of the air cleaner box 19 is connected as illustrated in FIG. 2.

The above-mentioned intake duct 80 includes the cowl inner duct 82, the frame inner duct 65 and the box-side duct 67. An intake passage is formed which penetrates the front end portion of the vehicle body frame 5 from the front end portion of the front cowl 46 to the air cleaner box 19 and extends substantially linearly as illustrated in FIG. 2.

Each pivot plate 8 extends downwardly in a state wherein the pivot plate 8 is bent at the rear end portion of each main frame 7. Between an upper portion and a lower portion of each pivot plate 8, an upper cross member 71 and a lower cross member 72 extend that are arranged along the vehicle width direction. On a vehicle-width-direction center portion of the lower cross member 72, a connecting portion 73 is provided with the above-mentioned link mechanism 14. The upper cross member 71 serves to adjust the rigidity of the vehicle body frame 5. Thus, the upper cross member 71 has a smaller size and a smaller thickness compared to the lower cross member 72.

On the approximate center portion in a vertical direction of each pivot plate 8, a shaft support portion 74 is mounted for supporting a pivot shaft of the swing arm 11. Further, on an upper portion and a lower portion of each pivot plate 8, a rear upper suspension portion 75 and a rear lower suspension portion 76 are mounted which connect a rear upper side and rear lower side of the crank case 16 of the engine 15 and support these portions. By allowing the respective portions of the engine 15 to be connected with the respective suspension portions 75, 76 and the above-mentioned front-side suspension portion 53, a rear half portion of the vehicle body frame 5 is suitably reinforced.

In this embodiment, the vehicle body frame 5 has a split-structure which includes four aluminum cast parts. More specifically, a head pipe portion 6A which integrates the head pipe 6 and front portions of the respective main frames 7, left and right main frame portions 7A which mainly include intermediate portions of the respective main frames 7, and a pivot plate portions 8A which integrates rear portions of the respective main frames 7 and the respective pivot plates 8 by way of the respective cross members 71, 72. The cast parts are integrally joining by welding.

Figure 5:
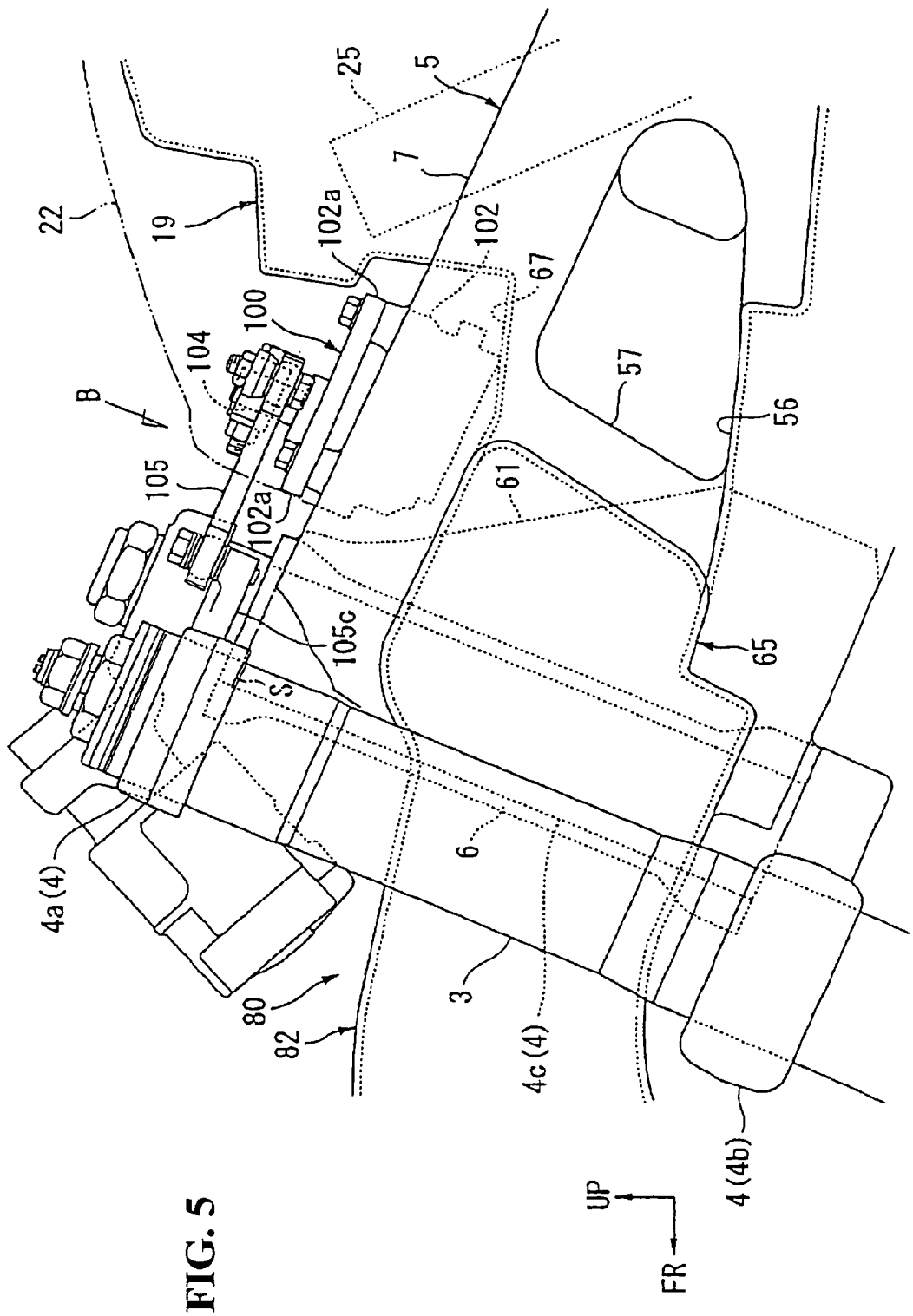
FIG. 5 is a side surface view showing a periphery of the steering damper of the motorcycle.
Figure 6:
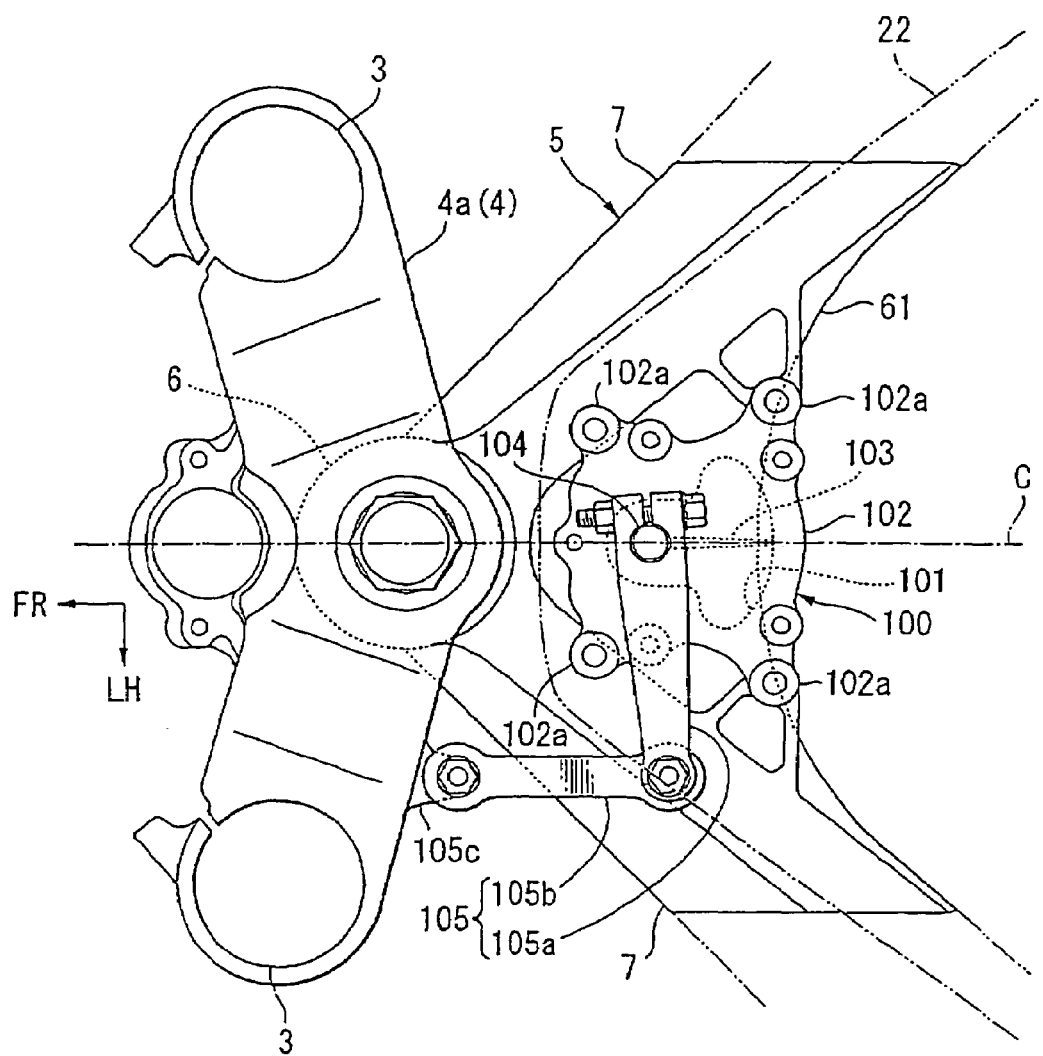
FIG. 6 is a view as viewed in an arrow B direction in FIG. 5.

As shown in FIGS. 5 and 6, the steering damper 100 is of a hydraulic rotary type which includes a housing 102 which defines an oil chamber 101 having a sector shape as viewed in a top surface view and a vane 103 which separates the oil chamber 101 into left and right chambers and is also tiltable inside of the oil chamber 101, and uses flow resistance of a working oil inside of the oil chamber 101 which is generated when the vane 103 is tilted as an attenuating force. A shaft 104 includes a tilting shaft (rotary shaft) of the vane 103 that is arranged parallel to the head pipe 6, and is integrally formed on a proximal end portion of the vane 103. A projecting portion of the shaft 104 from an upper wall of the housing 102 and a top bridge 4a of the steering system 4 are connected by way of the link mechanism 105.

On the other hand, the housing 102 of the steering damper 100 is fixed to the vehicle body frame 5 in a state wherein the housing 102 strides over the front portions of both main frames 7. When the steering system is rotated (steered) in the lateral direction, the vane 103 inside of the housing 102 is tilted by way of the link mechanism 105 and the shaft 104, and along with the tilting of the vane 103, the fluid resistance of the working oil which moves between the left and right oil chambers is transmitted to the steering system as the attenuation torque about the rotary shaft of the steering system. Accordingly, the rotary vibrations (kickback at the time of disturbances or the like) of the steering system of the motorcycle 1 can be suppressed.

Figure 7:
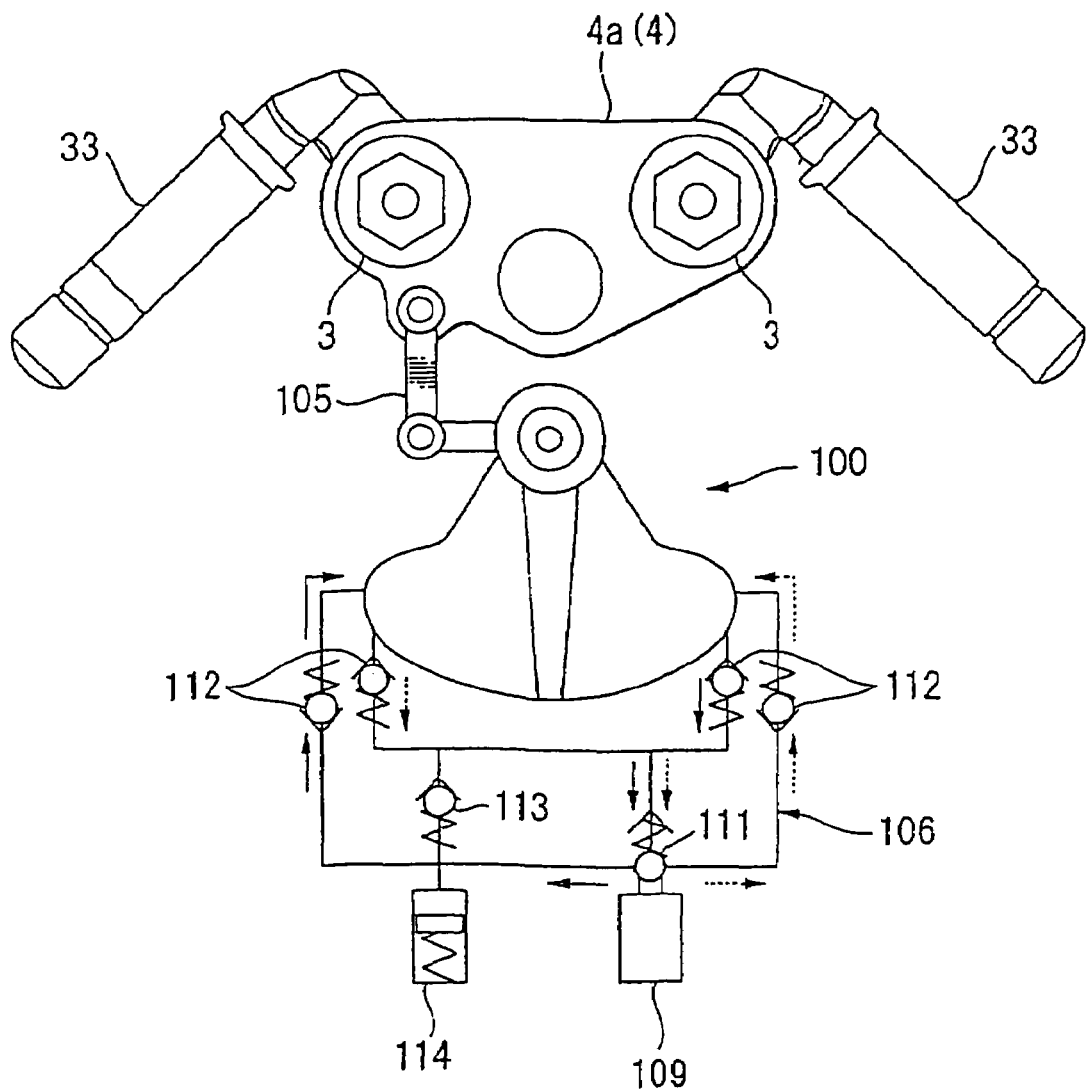
FIG. 7 is an explanatory view of a constitution of the steering damper.

As shown in FIG. 7, the steering damper 100 includes an electronically controlled hydraulic control circuit 106 for changing the attenuating force in response to a vehicle speed, for example.

The hydraulic control circuit 106 is, for example, arranged in the vertically extending manner inside of the housing 102, wherein a control part such as an ECU performs a control by determining a control electric current supplied to the solenoid 109 which is mounted on the housing 102 in response to the information from a vehicle speed sensor or the like.

The hydraulic control circuit 106 includes a main valve 111 which is operated by a solenoid 109 and changes the fluid resistance of the working oil, four check valves 112 for restricting the fluid direction of the working oil in one direction, a relief valve 113 which is arranged in parallel to the main valve 111 for restricting the maximum attenuating force, and an accumulator 114 for stabilizing the oil pressure inside of the circuit even when a volume change of the working oil attributed to temperature is generated.

In such a hydraulic control circuit 106, when the steering system is steered to the left, the working oil is restricted to flow as indicated by a solid-line arrow in the drawing, while when the steering system is steered to the right, the working oil is restricted to flow as indicated by a broken-line arrow in the drawing. In such a flow of the working oil, mainly in the main valve 111, the flow resistance (attenuating force) which corresponds to the degree of opening or a steering angle (tilting angular velocity of the vane 103) is generated.

The main valve 111 changes the degree of opening per se in response to the balance between a driving force of the solenoid 109 and a biasing force of the incorporated spring. The control part, at the low vehicle speed, lowers the control current value to the solenoid 109 and increases the degree of opening of the main valve 111 so as to decrease the flow resistance, while the control part elevates the control current value in response to the increase of the vehicle speed and decreases the degree of opening of the main valve 111 so as to increase the flow resistance.

As shown in FIGS. 5 and 6, the link mechanism 105 includes an arm 105a which has a proximal end portion thereof connected to the shaft 104, and a rod 105b which has one end portion thereof connected to a distal end portion of the arm 105a by way of a spherical support portion. A spherical support portion is similarly formed on another end portion of the rod 105b, and another end portion of the rod 105b is connected to a connecting portion 105c which projects rearwardly from the left side of the top bridge 4a by way of the spherical support portion.

Such a steering damper 100 is arranged behind the head pipe 6 of the vehicle body frame 5 and between the front portions of both main frames 7.

A box-shaped housing 102 in the steering damper 100 has an upper wall portion thereof arranged substantially parallel to the inclined plane S, and a plurality of boss portions 102a which are mounted on both sides of the upper wall portion that are brought into contact with support portions formed on the inner side of the front portions of both main frame 7 corresponding to these boss portions from above. In such a state, bolts which are inserted into respective boss portions 102a are fastened to the corresponding support portions thus being fixed to the vehicle body frame 5. In this state, the shaft 104 is positioned at the vehicle-width-direction center (lateral center).

Here, the steering damper 100 is arranged such that the steering damper 100 is positioned substantially below the inclined plane S, that is, the steering damper 100 is interposed between the front portions of both main frames 7. Due to such a construction, a top portion of the housing 102 which increases a vertical thickness thereof due to the integral mounting of the hydraulic control circuit 106 thereon is interposed between the front portions of both main frames 7. The housing 102 which is arranged in this manner is positioned right above the box-side duct 67 as a portion of the intake duct 80 and, at the same time, an upper wall portion of the housing 102 and an upper portion of the shaft 104 which are positioned above the inclined plane S are covered with a front end portion of the tank cover 22. Thus, only the link mechanism 105 is exposed to the outside from an opening (not shown in the drawing) of the tank cover 22.

As has been explained heretofore, the steering damper mounting structure of the above-mentioned embodiment includes the pair of left and right main frames 7 which extend toward the rear portion of the vehicle body from the head pipe 6 mounted on the front end portion of the vehicle body frame 5 in a left-and-right split manner for allowing the head pipe 6 to rotatably support the steering system for steering the front wheel 2. The steering damper 100 is arranged for imparting an attenuating force to the steering system on the left and right main frames 7 with the steering damper 100 being arranged above the intake duct 80 which penetrates the vicinity of the head pipe 6 of the vehicle body frame 5.

Due to such a construction, it is possible to suppress the projection height of the steering damper 100 from the upper surface of the body frame 5. Thus, respective parts in the periphery of the head pipe 6 can be arranged efficiently and in a compact manner. Further, since the steering damper 100 can be dropped inside of the vehicle body frame 5, the steering damper 100 can be made inconspicuous thus enhancing an appearance of the motorcycle. Further, since the position of the steering damper 100 is lowered, a driver can easily bend his/her upper body portion whereby the miniaturization of the cowl and the traveling performance can be enhanced. Further, the intake duct 80 which penetrates the vicinity of the head pipe 6 of the vehicle body frame 5 becomes a straight line compared to a case in which the intake duct 80 is arranged around the steering damper 100. Thus, the intake resistance can be suppressed whereby it is possible to easily introduce a flow of outside air (traveling air).

In the above-mentioned steering damper mounting structure, the steering dumper 100 is of a rotary type for generating the attenuating force due to the tilting of the vane 103 which partitions the oil chamber 101 inside of the housing 102. At the same time, the shaft 104 which includes the rotary shaft of the steering damper 100 is arranged at the approximate center in the lateral direction of the vehicle body. Accordingly, compared to a rod-type steering damper which uses a double acting cylinder, the steering damper 100 per se can be formed in a compact manner and, at the same time, the shaft 104 can be arranged close to the head pipe 6. Thus, it is possible to enhance the degree of freedom in the arrangement of the steering damper 100.

Further, in the above-mentioned steering damper mounting structure, the steering damper 100 is of an electronic control type which changes the attenuating force in response to the predetermined parameter (vehicle speed or the like). Thus, even when the hydraulic control circuit 106 is integrally mounted on the steering damper 100, it is possible to suppress the projection height of the steering damper 100 from the upper surface of the vehicle body frame 5. Thus, the steering damper 100 can be arranged in a compact manner.

In the above-mentioned steering damper mounting structure, the steering system includes the steering shaft 4c which is rotatably and pivotally supported on the head pipe 6, the left and right front forks 3, and the top bridge 4a and the bottom bridge 4b which connect the respective front forks 3 and the steering shaft 4c. The steering damper 100 is connected with the connecting portion 105c which projects rearwardly from the top bridge 4a by way of the link mechanism 105. Accordingly, the relative mounting tolerance between the steering-system parts and the steering damper 100 is absorbed. Thus, it is possible to favorably operate the steering damper 100 and, at the same time, the degree of freedom in the layout of the link mechanism 105 with respect to the top bridge 4a can be enhanced.

Still further, in the above-mentioned steering damper mounting structure, the steering damper 100 is arranged inside of the tank cover 22. Thus, the functional part such as the steering damper 100 can be made inconspicuous whereby the appearance around the head pipe 6 can be enhanced.

Still further, in the above-mentioned steering damper mounting structure, the intake duct 80 opens toward the front portion of the vehicle body with the rear portion of the intake duct 80 being connected to the air cleaner box 19 which is arranged between the left and right main frames 7. The steering damper 100 is arranged in the space which is sandwiched between the air cleaner box 19 and the head pipe 6. Accordingly, it is possible to arrange the respective parts around the head pipe 6 in a more compact manner.

The invention is not limited to the above-mentioned embodiment and, for example, the steering damper 100 may be arranged below the intake duct 80. In this case, the steering damper 100 may be connected with the connecting portion which projects rearwardly from the bottom bridge 4b by way of the link mechanism 105. Further, the tank cover 22 may also serve to cover the fuel tank 21.

The invention being thus described, it will be obvious that the same may be varied in many ways. Such variations are not to be regarded as a departure from the spirit and scope of the invention, and all such modifications as would be obvious to one skilled in the art are intended to be included within the scope of the claims.

What is claimed is:

1. A steering damper mounting structure for a vehicle comprising:
    a pair of left and right main frames extending toward a rear portion of a vehicle body from a head pipe mounted on a front end portion of a vehicle body frame in a left-and-right split manner;
    a steering system for rotatably mounting the head pipe;
    a steering damper for imparting an attenuating force to the steering system between the left and right main frames; and
    a steering shaft rotatably and pivotally supported on the head pipe, left and right front forks, and a bridge member for connecting the respective front forks, and the steering damper is connected with a connecting portion projecting rearwardly from the bridge member by way of a link mechanism,
    wherein the link mechanism includes:
        an arm which with a proximal end portion thereof connected to a shaft of the steering damper, and
        a rod which with one end portion thereof connected to a distal end portion of the arm, and
    wherein the steering damper is arranged above an intake duct in a vicinity of the head pipe of the vehicle body frame and arranged completely behind the head pipe and between front portions of the left and right main frames.

2. The steering damper mounting structure according to claim 1, wherein the steering damper is of a rotary type for generating the attenuating force due to tilting of a vane which partitions an oil chamber inside of a housing and, at the same time, a rotary shaft of the steering damper is arranged at the approximate center in a lateral direction of a vehicle body.

3. The steering damper mounting structure according to claim 1, wherein the steering damper is of an electronic control type for changing the attenuating force in response to a predetermined parameter.

4. The steering damper mounting structure according to claim 2, wherein the steering damper is of an electronic control type for changing the attenuating force in response to a predetermined parameter.

5. The steering damper mounting structure according to claim 1, wherein the left and right main frames overlap at least part of the steering damper when the steering damper structure is viewed in side view.

6. The steering damper mounting structure according to claim 2, wherein the left and right main frames overlap at least part of the steering damper when the steering damper structure is viewed in side view.

7. A steering damper mounting structure for a vehicle comprising:
    a pair of left and right main frames extending toward a rear portion of a vehicle body from a head pipe mounted on a front end portion of a vehicle body frame in a left-and-right split manner;
    a steering system for rotatably mounting the head pipe;
    a steering damper for imparting an attenuating force to the steering system between the left and right main frames; and
    a steering shaft rotatably and pivotally supported on the head pipe, left and right front forks, and a bridge member for connecting the respective front forks, and the steering damper is connected with a connecting portion projecting rearwardly from the bridge member by way of a link mechanism,
    wherein the link mechanism includes:
        an arm which with a proximal end portion thereof connected to a shaft of the steering damper, and
        a rod which with one end portion thereof connected to a distal end portion of the arm, and
    wherein the steering damper is arranged below an intake duct in a vicinity of the head pipe of the vehicle body frame and arranged completely behind the head pipe and between front portions of the left and right main frames.

8. The steering damper mounting structure according to claim 1, wherein the steering damper is arranged inside of and covered by a tank cover such that the steering damper is not exposed to the outside.

9. The steering damper mounting structure according to claim 2, wherein the steering damper is arranged inside of and covered by a tank cover such that the steering damper is not exposed to the outside.

10. The steering damper mounting structure according to claim 3, wherein the steering damper is arranged inside of and covered by a tank cover such that the steering damper is not exposed to the outside.

11. The steering damper mounting structure according to claim 5, wherein the steering damper is arranged inside of and covered by a tank cover such that the steering damper is not exposed to the outside.

12. The steering damper mounting structure according to claim 1, wherein the intake duct opens toward a front portion of the vehicle body, a rear portion of the intake duct being connected to an air box arranged between the left and right main frames, and the steering damper is arranged in a space sandwiched between the air box and the head pipe.

13. The steering damper mounting structure according to claim 2, wherein the intake duct opens toward a front portion of the vehicle body, a rear portion of the intake duct being connected to an air box arranged between the left and right main frames, and the steering damper is arranged in a space sandwiched between the air box and the head pipe.

14. The steering damper mounting structure according to claim 3, wherein the intake duct opens toward a front portion of the vehicle body, a rear portion of the intake duct being connected to an air box arranged between the left and right main frames, and the steering damper is arranged in a space sandwiched between the air box and the head pipe.

15. The steering damper mounting structure according to claim 5, wherein the intake duct opens toward a front portion of the vehicle body, a rear portion of the intake duct being connected to an air box arranged between the left and right main frames, and the steering damper is arranged in a space sandwiched between the air box and the head pipe.

16. The steering damper mounting structure according to claim 8, wherein the intake duct opens toward a front portion of the vehicle body, a rear portion of the intake duct being connected to an air box arranged between the left and right main frames, and the steering damper is arranged in a space sandwiched between the air box and the head pipe.

17. The steering damper mounting structure according to claim 7, wherein the left and right main frames overlap at least part of the steering damper when the steering damper structure is viewed in side view.

18. The steering damper mounting structure according to claim 7, wherein the steering damper is of a rotary type for generating the attenuating force due to tilting of a vane which partitions an oil chamber inside of a housing and, at the same time, a rotary shaft of the steering damper is arranged at the approximate center in a lateral direction of a vehicle body.

19. The steering damper mounting structure according to claim 7, wherein the steering damper is of an electronic control type for changing the attenuating force in response to a predetermined parameter.

20. The steering damper mounting structure according to claim 18, wherein the steering damper is of an electronic control type for changing the attenuating force in response to a predetermined parameter.

* * * * *